US011320853B2

(12) United States Patent
Ogiwara

(10) Patent No.: US 11,320,853 B2
(45) Date of Patent: May 3, 2022

(54) IMAGE TRANSMISSION APPARATUS, IMAGE TRANSMISSION SYSTEM, AND METHOD OF CONTROLLING IMAGE TRANSMISSION APPARATUS

(71) Applicant: NEC Display Solutions, Ltd., Tokyo (JP)

(72) Inventor: Yusuke Ogiwara, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/080,578

(22) PCT Filed: Mar. 14, 2016

(86) PCT No.: PCT/JP2016/057936
§ 371 (c)(1),
(2) Date: Aug. 28, 2018

(87) PCT Pub. No.: WO2017/158672
PCT Pub. Date: Sep. 21, 2017

(65) Prior Publication Data
US 2019/0018443 A1 Jan. 17, 2019

(51) Int. Cl.
G06F 1/08 (2006.01)
G06F 1/32 (2019.01)
G06F 9/06 (2006.01)
G06F 3/14 (2006.01)
H04N 21/2662 (2011.01)
(Continued)

(52) U.S. Cl.
CPC ............ *G06F 1/08* (2013.01); *G06F 1/324* (2013.01); *G06F 1/3296* (2013.01); *G06F 3/14* (2013.01); *G06F 3/1462* (2013.01); *G06F 9/06* (2013.01); *H04N 21/2662* (2013.01);
(Continued)

(58) Field of Classification Search
None
See application file for complete search history.

(56) References Cited

U.S. PATENT DOCUMENTS 7,388,579 B2   6/2008 O'Gorman et al.
7,800,621 B2 * 9/2010 Fry ................... G06F 1/3225
                                                     345/531
(Continued)

FOREIGN PATENT DOCUMENTS

CN    1394326 A    1/2003
CN    1551098 A    12/2004
(Continued)

OTHER PUBLICATIONS

International Search Report (ISR) (PCT Form PCT/ISA/210), in PCT/JP2016/057936, dated Jun. 7, 2016.
(Continued)

Primary Examiner — Fahmida Rahman
(74) Attorney, Agent, or Firm — McGinn IP Law Group, PLLC

(57) ABSTRACT

An image transmission apparatus includes: a processor that performs a process of generating image data and that transmits the image data to a display apparatus connected via a network; and a clock controller that receives information relating to a display mode of the display apparatus from the display apparatus and that controls a drive clock frequency of the processor based on the information.

9 Claims, 5 Drawing Sheets

(51) Int. Cl.
*G06F 1/324* (2019.01)
*G06F 1/3296* (2019.01)

(52) U.S. Cl.
CPC . *G09G 2320/103* (2013.01); *G09G 2330/023* (2013.01); *G09G 2340/0435* (2013.01); *G09G 2350/00* (2013.01)

(56) References Cited

U.S. PATENT DOCUMENTS

| | | | | |
|---|---|---|---|---|
| 8,866,725 | B2* | 10/2014 | Yamazaki | G09G 3/3648 345/100 |
| 9,472,782 | B2 | 10/2016 | Koyama | |
| 10,565,963 | B2 | 2/2020 | Kim et al. | |
| 2003/0020699 | A1* | 1/2003 | Nakatani | G06F 3/1415 345/204 |
| 2005/0088384 | A1 | 4/2005 | Kayada et al. | |
| 2005/0206604 | A1* | 9/2005 | Washio | G09G 3/3688 345/98 |
| 2006/0212286 | A1* | 9/2006 | Pearson | G06Q 10/107 704/9 |
| 2013/0162607 | A1* | 6/2013 | Ichieda | G06F 3/0425 345/204 |
| 2013/0216140 | A1* | 8/2013 | Hsieh | G06T 1/20 382/218 |
| 2014/0253574 | A1* | 9/2014 | Brown | G06T 1/0007 345/545 |

FOREIGN PATENT DOCUMENTS

| | | | | |
|---|---|---|---|---|
| CN | 101231823 | A | 7/2008 | |
| CN | 105096796 | A | 11/2015 | |
| JP | H 04-0219816 | A | 8/1992 | |
| JP | 2002-207528 | A | 7/2002 | |
| JP | 2002-366252 | A | 12/2002 | |
| JP | 2007-219835 | A | 8/2007 | |
| JP | 2010-257424 | A | 11/2010 | |
| JP | 2011-120040 | A | 6/2011 | |
| JP | 2013/141230 | A | 7/2013 | |
| JP | 201772644 | | * 4/2017 | G09G 5/00 |
| WO | WO 2000/002118 | A1 | 1/2000 | |

OTHER PUBLICATIONS

Japanese Office Action dated Jun. 30, 2020, in Japanese Patent Application No. 2018-505062 with an English translation.
Chinese Office Action dated Nov. 3, 2020, in Chinese Patent Application No. 201680083482.9 with an English translation.

* cited by examiner

IMAGE TRANSMISSION APPARATUS, IMAGE TRANSMISSION SYSTEM, AND METHOD OF CONTROLLING IMAGE TRANSMISSION APPARATUS

TECHNICAL FIELD

The present invention relates to an image transmission apparatus that transmits an image displayed on a transmitting side to a receiving side, an image transmission system and a method of controlling the image transmission apparatus.

BACKGROUND ART

There is a technique of transmitting a screen image displayed on a display unit attached to a personal computer (PC) as image data from the PC to a remote display apparatus via a network. Using, for example, a wireless LAN (Local Area Network) as a network is convenient because it is thereby possible to reflect, in a display apparatus located remotely from a PC, the same screen image as the screen image on the display unit of the PC and also to present a moving picture, without using a cable. There are roughly two types of methods of transmitting a screen image displayed on a PC to a display apparatus via a network. One is a method of transmitting image data of a whole screen as is and the other is a method of transmitting only a difference from a screen image transmitted last time as difference image data. When image data of a whole screen is transmitted, the amount of data transmitted via a network increases, but the amount of processing necessary for the PC to transmit the image data is small. In contrast, the method of transmitting the difference image data can reduce the amount of data to be transmitted, and so the method is particularly suited to transmit image data of the screen via a network having a small transmission bandwidth, but since it is necessary to calculate the difference between screen images, the amount of processing executed by the PC on the transmitting side increases.

The PC is generally provided with a processor called a "CPU (Central Processing Unit)" or a "GPU (Graphics Processing Unit)" which executes various types of computation processing including image processing. The processor is a component that consumes power most in the PC. The processor executes an instruction such as an operation instruction or a logical instruction in accordance with a drive clock thereof. As the drive clock frequency increases, the computation processing amount of the processor increases, but power consumption also increases. The drive clock frequency is also called an "operating frequency." The drive clock frequency here refers to a frequency of a clock used in the processor for operation of a logic circuit or a arithmetic circuit of the processor.

In recent years, battery-driven notebook or tablet PCs are widely going on the market and many measures are being tried in order to extend battery drive times. For example, an operating mode in which a decreased operating frequency of the processor is implemented as a power saving mode is known. Furthermore, Patent Literature 1 discloses that an amount of load of a processor is detected and compared with a threshold and an operating frequency of the processor is automatically changed in accordance with the comparison result. Patent Literature 2 discloses that a drive clock frequency and a supply voltage are made changeable for each circuit block provided in a processor, the number of circuit blocks operating at a high drive clock frequency and a high supply voltage is limited to achieve both a reduction of power consumption and an improvement of processing speed for the processor as a whole. Furthermore, Patent Literature 3 discloses an image processing apparatus provided with a plurality of processors having different drive frequencies and therefore different processing capabilities and power consumption levels in which a processor that executes image processing can be selected from among a plurality of processors in accordance with the scale of a memory region available for image processing.

CITATION LIST

Patent Literature

Patent Literature 1: JP 2002-366252 A
Patent Literature 2: WO 00/02118 A1
Patent Literature 3: JP 2011-120040 A

SUMMARY OF INVENTION

Technical Problem

As a technique of reducing power consumption of a processor such as a CPU, a drive frequency of the processor is generally decreased. However, when the drive frequency is decreased, performance of the processor may decrease significantly compared to the original performance At this time, in the method whereby a difference from the previous screen image is calculated and difference data is transmitted among the above-described image data transmission methods, a lot of processing is required to calculate the difference, but when the drive frequency is decreased and the performance of the processor is reduced, the originally required performance may not be achieved and processing may be delayed. Such a processing delay may lead to frame dropping of a transmitted video on a display apparatus on the receiving side or discontinuous playing back (so-called jumping). When the user's action is limited to such an extent as creating text on a PC using word processor software or browsing web pages, such a reduction of performance may not be so annoying. However, this performance reduction may be considered as a significant degradation in the display quality in presentation in a conference or in the case of transmitting a moving picture.

It is an object of the present invention to provide an image transmission apparatus, an image transmission system and a method of controlling the image transmission apparatus capable of reducing power consumption and the like without causing degradation of display quality in image transmission when transmitting image data to a display apparatus connected via a network.

Solution to Problem

According to an aspect of the present invention, an image transmission apparatus includes: a processor that performs a process of generating image data and that transmits the image data to a display apparatus connected via a network; and a clock controller that receives information relating to a display mode of the display apparatus from the display apparatus and that controls a drive clock frequency of the processor based on the information.

According to another aspect of the present invention, an image transmission system includes: an image transmission apparatus; and a display apparatus connected to the image transmission apparatus via a network, in which the image transmission apparatus includes: a processor that performs a process of generating image data and that transmits the image data to the display apparatus; and a clock controller that receives information relating to a display mode of the display apparatus from the display apparatus and that controls a drive clock frequency of the processor based on the information.

According to yet another aspect of the present invention, a method of controlling an image transmission apparatus is a method of controlling an image transmission apparatus provided with a processor that performs a process of generating image data and that transmits the image data to a display apparatus connected via a network, the method including: receiving information relating to a display mode of the display apparatus from the display apparatus; and controlling a drive clock frequency of the processor based on the information.

According to the present invention, when transmitting image data to the display apparatus connected via the network, it is possible to reduce power consumption and the like without causing degradation of display quality in image transmission.

DESCRIPTION OF EMBODIMENTS

Figure 1:
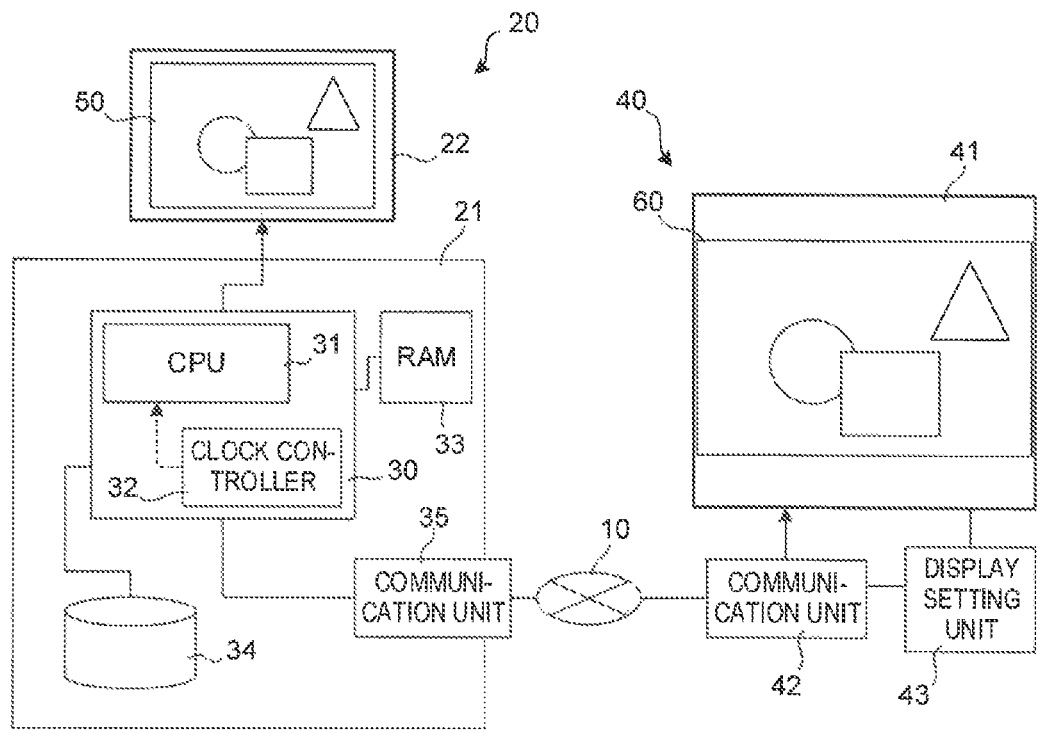
FIG. 1 is a block diagram illustrating a configuration of an image transmission system according to an exemplary embodiment.

Next, exemplary embodiments will be described with reference to the accompanying drawings. FIG. 1 illustrates an image transmission system according to an exemplary embodiment. The image transmission system illustrated is constructed of image transmission apparatus 20 provided on a transmitting side and display apparatus 40 provided on a receiving side, and image transmission apparatus 20 and display apparatus 40 are connected together via network 10. In addition to a wired or wireless LAN or the like, network 10 may include a mode in which the two devices are connected via a USB (Universal Serial Bus) cable or the like.

Image transmission apparatus 20 is configured, for example, as a general PC (personal computer) capable of executing various types of application software and is provided with main unit 21 and display unit 22 connected to main unit 21. Image transmission apparatus 20 is preferably a portable PC of a notebook type or tablet type and can be driven by a battery. Display unit 22 is, for example, a liquid crystal display. Main unit 21 is provided with: processing unit 30 including CPU 31, RAM (Random Access Memory) 33 functioning as a main storage connected to CPU 31; storage apparatus 34 such as a hard disk drive; and communication unit 35 serving as an interface with network 10. CPU 31 also functions as a processor that executes application software, captures a screen image displayed on display unit 22 to generate image data and transmits the image data to display apparatus 40. Storage apparatus 34 stores application software and data or the like used by the application software as well as a program such as an operating system (OS) for operating image transmission apparatus 34.

CPU 31 is enabled to change a drive clock frequency thereof for power saving or the like, and for this reason, processing unit 30 is also provided with clock controller 32 that controls the drive clock frequency of CPU 31. In the figures, clock controller 32 is provided outside CPU 31, but clock controller 32 may also be provided inside CPU 31 according to the architecture of CPU 31. As will be described later, clock controller 32 can receive information relating to a display mode in display apparatus 40 from display apparatus 40 on the receiving side and control an increase or a decrease of the drive clock frequency of CPU 31 based on the received information relating to the display mode. Image transmission apparatus 20 is constructed of a PC or the like, and thereby executes various types of application software and displays an execution result thereof on display unit 22, and is particularly provided with a function of transmitting a whole or part of the screen image displayed on display unit 22 to display apparatus 40 on the receiving side via network 10. Images displayed on display unit 22 are not limited to screen images as a user interface of the application software but may be various types of still images and moving pictures.

Display apparatus 40 is, for example, a projector or a large-size display and is provided with: receiving side display unit 41 that actually displays an image or projects an image onto a screen or the like; receiving unit 42 that serves as an interface with respect to network 10; and display setting unit 43 that sets a display mode in receiving side display unit 41. Display apparatus 40 is typically provided as office equipment in a conference room or the like and operates with a commercial power source. Receiving side display unit 41 is provided with a plurality of display modes as modes for displaying a content. A display mode shows a display range of a content on a screen of display apparatus 40. In this example shown here, the display modes include: a full screen display mode for displaying one image using a whole or most part in a displayable range of the screen of display apparatus 40; a reduction display mode for displaying only one image using only part in the displayable range; a divided display mode in which the displayable range is divided into two or more segments and images differing from one segment to another are displayed; and so on. These display modes define the display range of a content on receiving side display unit 41 and individual segments in the divided display mode are called "divided screens." These display modes are configured to be switchable by display setting unit 43.

In display apparatus 40, image data transmitted via network 10 is received by communication unit 42 and receiving side display unit 41 displays or projects the image data as a content in accordance with the display mode set by display setting unit 43. Here, "display" including "projection" of an image is called "display of an image." In this case, for example, in a divided display mode, display apparatus 40 can display images from a plurality of different transmitting side apparatuses (or image sources) simultaneously. Setting of a display mode by means of display setting unit 43 is performed by, for example, using a remote controller (not shown) belonging to display apparatus 40 or in response to a request sent from the transmitting side apparatus (e.g., image transmission apparatus 20). When the display mode is changed, for example, when the display range of each content is changed, display setting unit 43 notifies each transmitting side apparatus, for example, image transmission apparatus 20, of information relating to the display mode.

When image transmission apparatus 20 on the transmitting side and display apparatus 40 on the receiving side are configured as described above, suppose that a screen image denoted by reference numeral 50 is displayed on display unit 22 by execution of application software in image transmission apparatus 20. The screen image denoted by reference numeral 50 may be a moving picture or an execution screen of application software or a user interface screen. Screen image 50 is captured by CPU 31 and transmitted as a video content from communication unit 35 to display apparatus 40 on the receiving side via network 10. As a result, receiving side display unit 41 of display apparatus 40 displays screen image 60 identical to screen image 50 on the transmitting side.

Figure 2:
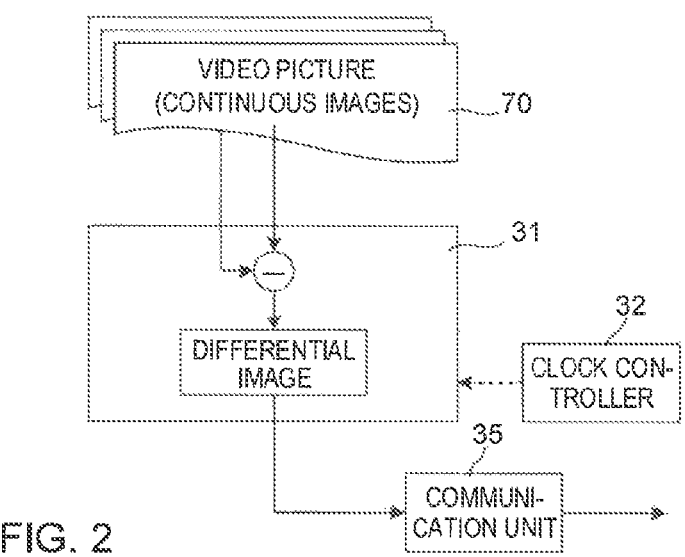
FIG. 2 is a diagram describing differential processing on a screen image.

Next, transmission of image data by image transmission apparatus 20 of the present exemplary embodiment will be described in detail using FIG. 2. Suppose that a video (that is, continuous images) is displayed on display unit 22 of image transmission apparatus 20 as denoted by reference numeral 70. CPU 31 captures the video for every frame, acquires a difference between frames of the video and generates a difference image. CPU 31 transmits difference image data based on the difference image to display apparatus 40 on the receiving side from communication unit 35 via network 10. Since a difference amount per unit time when acquiring the difference between video frames is related to a processing amount necessary for CPU 31 to calculate the difference, the difference amount constitutes one element for controlling the drive clock frequency of CPU 31. As for the display mode in display apparatus 40 which becomes a transmission destination of image data, the size of image data required differs, for example, between the full screen mode and the reduction screen mode, and if the size of image data differs, the amount of calculation necessary for processing the image data also differs, and therefore the display mode constitutes one element for controlling the drive clock frequency of CPU 31. Thus, in the present exemplary embodiment, clock controller 32 controls the drive clock frequency of CPU 31 so as to be able to smoothly generate and transmit difference image data based on information relating to the display mode sent from display apparatus 40, that is, information relating to a display range of a content, and a difference amount generated when acquiring a difference image from the video frame.

For example, when image transmission apparatus 20 on the transmitting side is in a power-saving state and the drive clock frequency of CPU 31 is decreasing, clock controller 21 controls an increase or a decrease of the drive clock frequency of CPU 31 according to a state of a transmitting side content displayed on receiving side display unit 41 of display apparatus 40 and a state of a content displayed on display unit 22 on the transmitting side. As an example, when the apparatus on the transmitting side is in a power-saving state, if the content from the transmitting side is displayed on a full screen in display apparatus 40 on the receiving side, in response to notification that a full screen display mode is in progress from display apparatus 40, clock controller 32 performs control so as to cause the drive clock frequency of CPU 31 to increase and prevent the drive clock frequency from decreasing. As other control, when a content from the transmitting side is displayed in some mode in display apparatus 40 and the difference amount when acquiring difference image data from the content on the transmitting side is large, clock controller 32 performs control so as to cause the drive clock frequency of CPU 31 to increase and prevent the drive clock frequency from decreasing. On the other hand, when a content from the transmitting side is not displayed in display apparatus 40 when image transmission apparatus 20 is in a normal state instead of being in a power-saving state or when the content on the transmitting side is displayed on a divided display but the difference amount decreases, clock controller 32 allows the drive clock frequency of CPU 31 to decrease.

The present exemplary embodiment controls the drive clock frequency of CPU 31 using not only the difference amount obtained when image transmission apparatus 20 acquires a difference image but also information relating to the display range of content (that is, the display mode) in display apparatus 40 notified from display apparatus 40 on the receiving side to image transmission apparatus 20. It is thereby possible to transmit difference image data that fits the display range of the transmitting side content on display apparatus 40 while optimally controlling the drive clock frequency of CPU 31 and achieving power saving as a whole.

Figure 3:
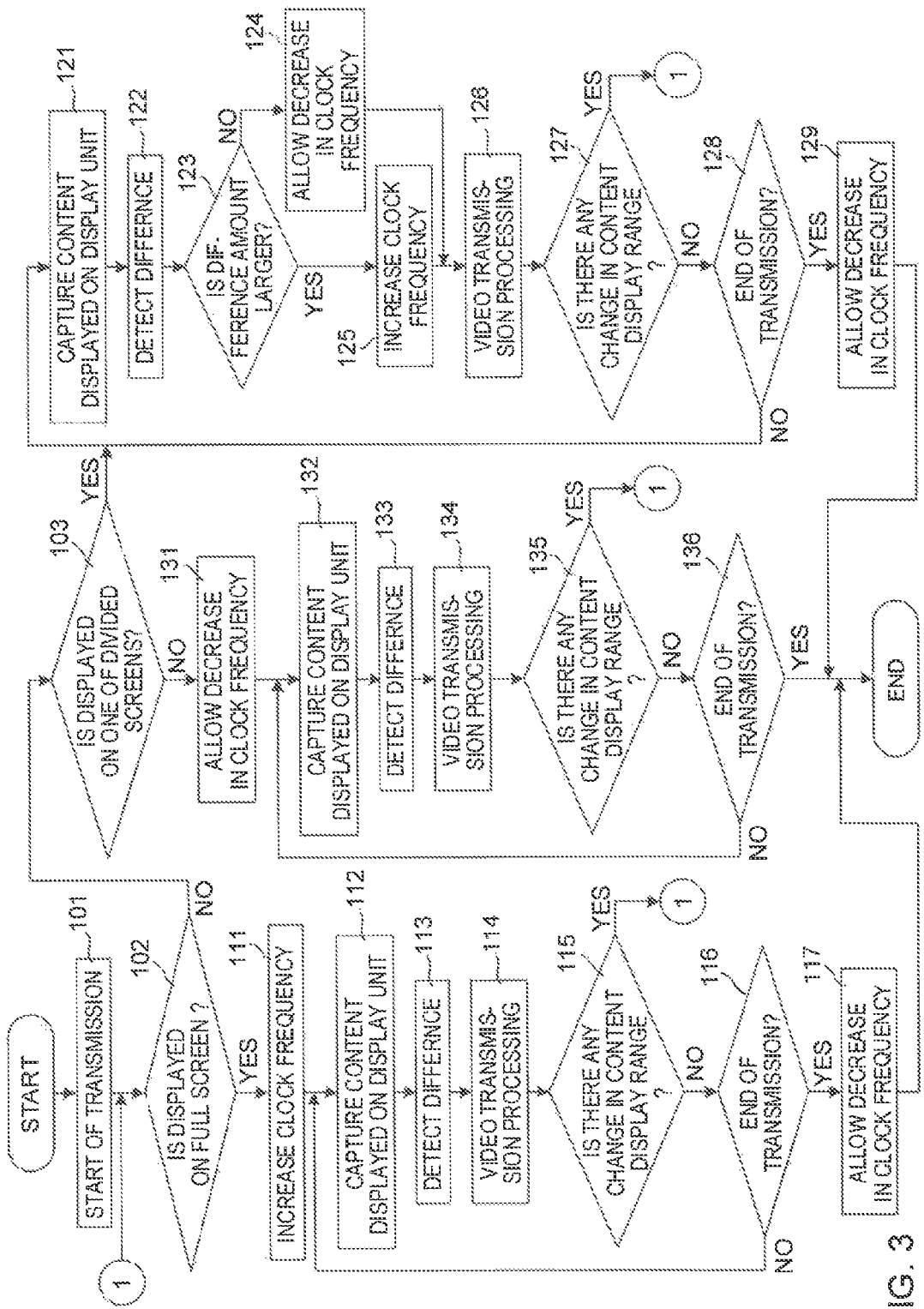
FIG. 3 is a flowchart describing processing in an image transmission apparatus.

FIG. 3 is a flowchart describing details of an example of control of the drive clock frequency of CPU 31 in aforementioned image transmission apparatus 20. In step 101, CPU 31 starts to transmit image data from image transmission apparatus 20 to display apparatus 40 on the receiving side. Then, in step 102, based on information relating to the display mode from display apparatus 40, clock controller 32 determines whether or not the image data transmitted from image transmission apparatus 20 is displayed on a full screen in display apparatus 40.

When the image data is displayed on a full screen, that is, when a full screen mode is in progress, a large amount of calculation is required to acquire the corresponding difference image, and so in step 111, clock controller 32 causes the drive clock frequency of CPU 31 to increase. Note that there may be a case where the drive clock frequency is close to an upper limit or a case where the drive clock frequency has already reached a level at which sufficient performance can be exerted, and so "causing the drive clock frequency to increase" includes keeping the current drive clock frequency so as to prevent the drive clock frequency from decreasing. After that CPU 31 captures an image (content) displayed on display unit 22 in step 112, detects a difference between the current frame and the preceding frame in step 113, and performs transmission processing on the video frame based on the difference image data in step 114. Clock controller 32 then determines, in step 115, whether or not the display mode in display apparatus 40 has changed, that is, there is any change in the content display range in display apparatus 40 based on information relating to the display mode sent from display apparatus 40. The process returns to step 102 when there is any change in the content display range, that is, when there is a change in the display mode or CPU 31 determines, in step 116, whether or not the transmission has ended. The process returns to step 112 for transmission of the next frame when the transmission has not ended or clock controller 32 allows the drive clock frequency to decrease in step 117 so as to return the drive clock frequency raised in step 111 to the original drive clock frequency when the transmission has ended. After that, a series of processes ends.

In step 117, "the drive clock frequency is allowed to decrease" instead of "the drive clock frequency is caused to decrease" because it may be necessary to keep the drive clock frequency high in processes other than the image transmission processes being executed by CPU 31. In other words, the process of "allowing the drive clock frequency to decrease" can also be said to be a step of "allowing (enabling) the drive clock frequency to decrease." When CPU 31 is not executing any process with a large processing load other than the image transmission process, the drive clock frequency of CPU 31 decreases in step 117.

In step 102 when the image data is not displayed on a full screen, clock controller 32 determines, in step 103, whether or not the display mode of display apparatus 40 is a divided display mode and whether or not the image data transmitted from image transmission apparatus 20 is displayed on one of divided screens in receiving side display unit 41, based on information relating to the display mode from display apparatus 40. When the image data is displayed on one of the divided screens, CPU 31 captures, in step 121, an image (content) displayed on display unit 22 and detects a difference between the current frame and the preceding frame in step 122. In step 123, clock controller 32 determines whether or not the detected difference amount is large, or more specifically, compares the difference amount with a threshold and determines whether or not the difference amount is larger. When the difference amount is not larger, this is a case where no large processing amount is required of CPU 31, and so in step 124, clock controller 32 allows the drive clock frequency of CPU 31 to decrease, and the process then proceeds to step 126. On the other hand, when it is determined in step 123 that the difference amount is larger, this is a case where a large processing amount is required of CPU 31, and so in step 125, clock controller 32 causes the drive clock frequency of CPU 31 to increase and then the process proceeds to step 126.

In step 126, CPU 31 performs transmission processing on the video frame based on the difference image data. In step 127, clock controller 32 determines whether or not the display mode in display apparatus 40 has changed, that is, whether or not there is any change in the content display range in display apparatus 40. Here, the process returns to step 102 when there is any change in the content display range or in step 128, CPU 31 determines whether or not the transmission has ended. The process returns to step 121 for transmission of the next frame when the transmission has not ended or in step 129, clock controller 32 allows the drive clock frequency to decrease when the transmission has ended. After that, a series of processes ends.

In step 103, when the image data transmitted from image transmission apparatus 20 is not displayed on one of the divided screens in receiving side display unit 41, this is a case of, for example, a reduction display mode, where no large processing amount is required of CPU 31. In this case, in step 131, clock controller 32 allows the drive clock frequency of CPU 31 to decrease. After that, in step 132, CPU 31 captures an image (content) displayed on display unit 22, detects, in step 133, a difference between the current frame and the preceding frame and performs, in step 134, a transmission process on the video frame based on the difference image data. In step 135, clock controller 32 determines whether or not the display mode in display apparatus 40 has changed, that is, whether or not there is any change in the content display range in display apparatus 40. Here, the process returns to step 132 when there is any change in the content display range, that is, when there is any change in the display mode or CPU 31 determines whether or not the transmission has ended in step 136 when there is no change in the content display range. The process returns to step 132 for transmission of the next frame when the transmission has not ended or a series of processes ends as is when the transmission has ended.

One of cases where a content from image transmission apparatus 20 is displayed neither on a full screen nor as one of divided screens in display apparatus 40 is a case where the content is not displayed in display apparatus 40 in the first place, and in that case, the process may execute step 103 to step 131, and then skip execution of steps 132 to 134 and proceed to step 135.

Figure 4:
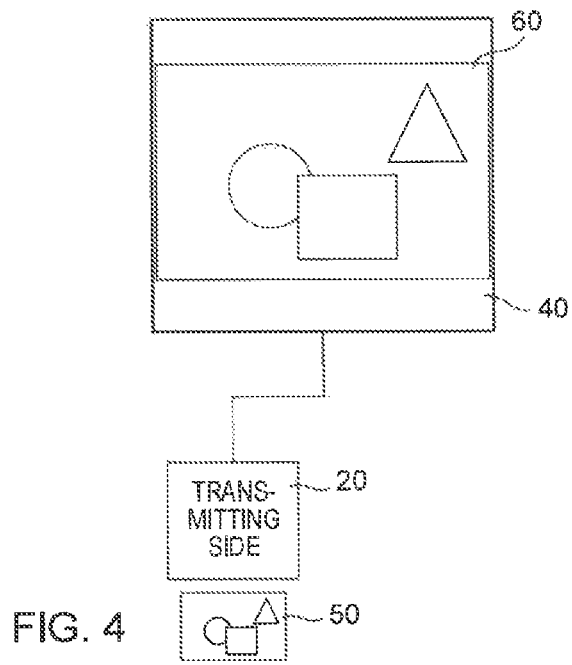
FIG. 4 is a diagram illustrating a connection relationship between the image transmission apparatus on the transmitting side and a display apparatus on a receiving side.

Next, a connection mode between the image transmission apparatus on the transmitting side and the receiving apparatus on the receiving side in the image transmission system according to the present exemplary embodiment will be described using FIG. 4 to FIG. 7. In the following description, M and N are both integers of 2 or greater. FIG. 4 corresponds to a conceptual expression of FIG. 1, showing a one-to-one connection, that is, a case where one transmitting side apparatus (image transmission apparatus 20) and one receiving side apparatus (display apparatus 40) are connected together. At this time, content 50 displayed on the display unit of image transmission apparatus 20 is displayed on display apparatus 40 as content 60 as described above.

Figure 5:
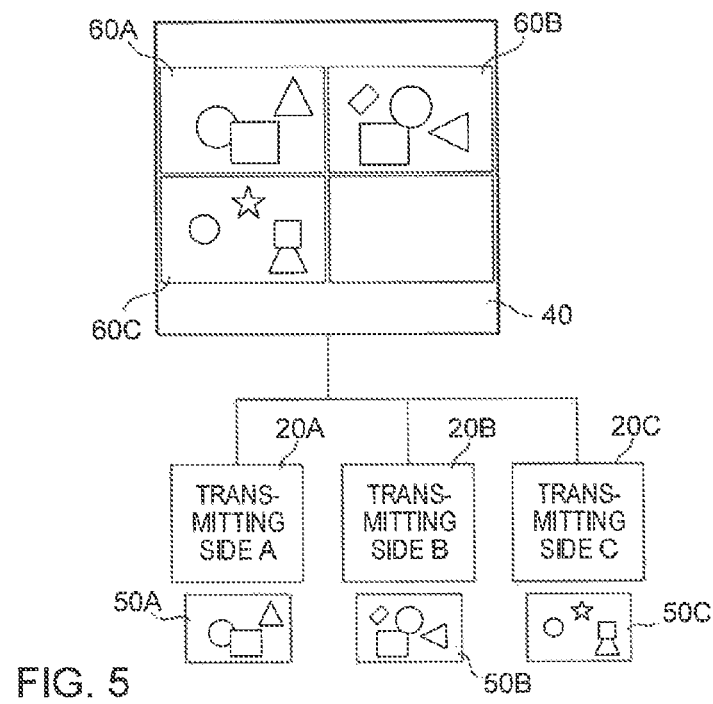
FIG. 5 is a diagram illustrating a connection relationship between the image transmission apparatus on the transmitting side and the display apparatus on the receiving side.

FIG. 5 illustrates an N-to-1 connection mode, that is, a case where N transmitting side apparatuses are connected to one receiving side apparatus (display apparatus 40). Here, three image transmission apparatuses 20A to 20C denoted as "transmitting side A" to "transmitting side C" are connected to one receiving apparatus 40 as an example. At this time, as shown in FIG. 5, display apparatus 40 may be set in a divided display mode, contents 50A to 50C displayed on image transmission apparatuses 20A to 20C connected to display apparatus 40A may be displayed as contents 60A to 60C on the respective divided screens in display apparatus 40. Alternatively, display apparatus 40 may select a specific image transmission apparatus and a content from the selected image transmission apparatus may be displayed on a full screen. At this time, information indicating that the content is not displayed is notified to those image transmission apparatuses which have not been selected as information relating to the content display range (display mode).

Figure 6:
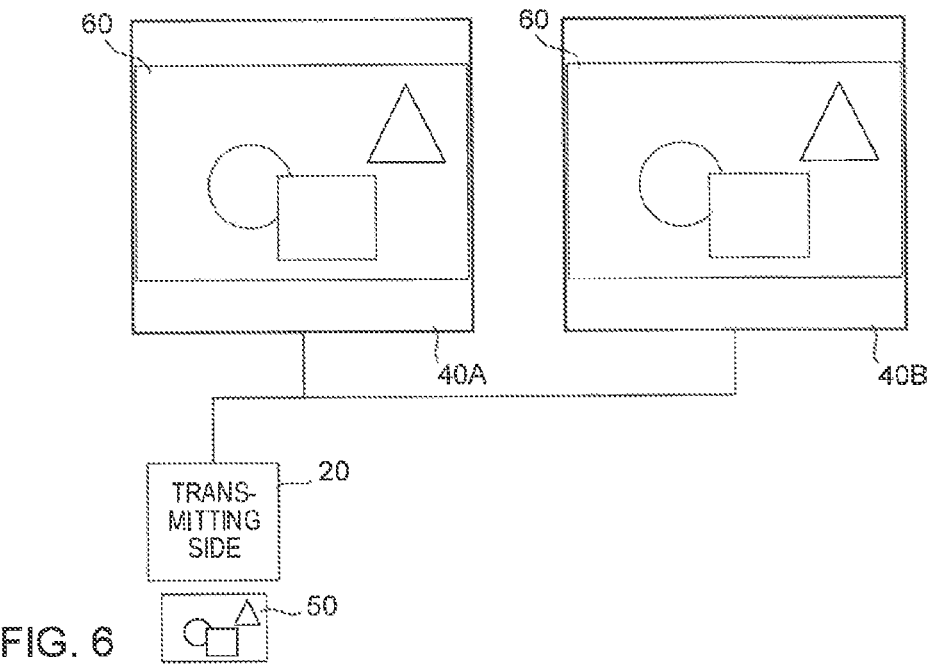
FIG. 6 is a diagram illustrating a connection relationship between the image transmission apparatus on the transmitting side and the display apparatus on the receiving side.

FIG. 6 illustrates a 1-to-M connection mode, that is, a mode in which one transmitting side apparatus (image transmission apparatus 20) is connected to a plurality of receiving side apparatuses. In the illustrated example, two display apparatuses 40A and 40B are connected as the receiving side apparatuses. Content 50 displayed on the display of image transmission apparatus 20 is displayed as content 60 in each of display apparatuses 40A and 40B.

Figure 7:
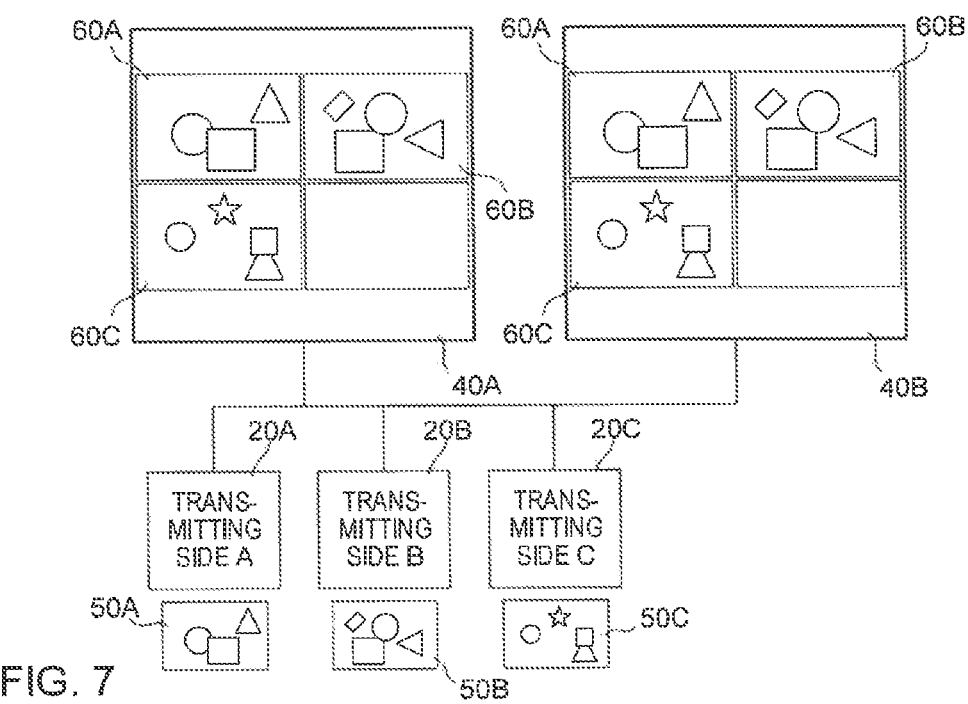
FIG. 7 is a diagram illustrating a connection relationship between the image transmission apparatus on the transmitting side and the display apparatus on the receiving side.

FIG. 7 illustrates an N-to-M connection mode, that is, a mode in which one transmitting side apparatus (image transmission apparatus 20) is connected to a plurality of receiving side apparatuses. Three image transmission apparatuses 20A to 20C are provided as the illustrated transmitting side apparatuses and two display apparatuses 40A and 40B are provided as the receiving side apparatuses. Here, two display apparatuses 40A and 40B are both in a divided display mode and contents 50A to 50C displayed on image transmission apparatuses 20A to 20C are displayed on the divided screens of each of display apparatuses 40A and 40B as contents 60A to 60C, respectively. Alternatively, at least one of display apparatuses 40A and 40B may be set to a full screen display mode and a content displayed on any one of image transmission apparatuses 20A to 20C may be displayed on the display apparatus thereof.

In the aforementioned exemplary embodiment, a screen image displayed on the display unit of the image transmission apparatus is captured, difference image data is generated from the captured image and transmitted to the display apparatus on the receiving side, but the present invention is not limited to this. The present invention is generally applicable to an image transmission system including an image transmission apparatus that performs processing of generating image data and a display apparatus that displays the image data obtained through the processing in the image transmission apparatus.

Figure 8:
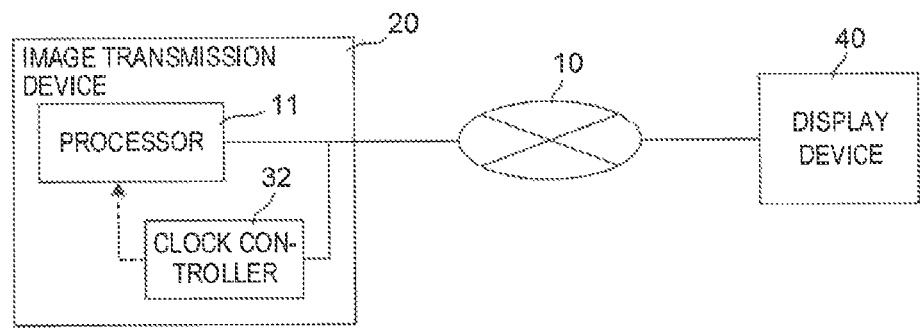
FIG. 8 is a block diagram illustrating a configuration of an image transmission system according to another exemplary embodiment.

FIG. 8 illustrates an image transmission system according to another exemplary embodiment. The image transmission system is provided with image transmission apparatus 20 and display apparatus 40 connected to image transmission apparatus 20 via network 10. Image transmission apparatus 20 is provided with: processor 11 that performs processing of generating image data and that transmits the image data to display apparatus 40; and clock controller 32 that receives information relating to a display mode of display apparatus 40 from display apparatus 40 and controls a drive clock frequency of processor 11 based on the information. As processor 11, CPU 31 in the aforementioned exemplary embodiment may be used or a processing unit of another configuration may be used.

In the aforementioned exemplary embodiment, in a case such as one where the drive clock frequency of CPU 31 or processor 11 can be changed by writing a specific value to a specific register of CPU 31 or processor 11, the aforementioned functions of clock controller 32 can be implemented by a program executed by CPU 31 or processor 11. Such a program is read into storage apparatus 34 via, for example, an external storage medium or network 10 in the configuration shown in FIG. 1.

When transmitting an image or moving picture to display apparatus 40, image transmission apparatus 20 of each exemplary embodiment described above causes performance to be maintained without causing the drive clock frequency of CPU 31 or processor 11 to decrease when image transmission apparatus 20 requires performance of CPU 31 or processor 11 or allows the drive clock frequency to decrease when processing is not necessary based on the setting in display apparatus 40 connected via network 10, thus optimizing transmission of images or moving pictures.

Part or a whole of the above-described exemplary embodiments can be described as the following Supplementary Notes, but the exemplary embodiments are not limited to the Supplementary Notes.

(Supplementary Note 1)

An image transmission apparatus comprising:

a processor that performs a process of generating image data and that transmits the image data to a display apparatus connected via a network; and a clock controller that receives information relating to a display mode of the display apparatus from the display apparatus and that controls a drive clock frequency of the processor based on the information.

(Supplementary Note 2)

The image transmission apparatus according to Supplementary Note 1, further comprising a display unit that displays an image, wherein the processor captures the image displayed on the display unit and generates the image data that is based on a difference image between the image captured last time and the image captured this time.

(Supplementary Note 3)

The image transmission apparatus according to Supplementary Note 2, wherein the clock controller controls the drive clock frequency based on the information and a difference amount generated when acquiring the difference image.

(Supplementary Note 4)

The image transmission apparatus according to Supplementary Note 3, wherein the clock controller controls the drive clock frequency so as to prevent the drive clock frequency from decreasing in a first case where the image is displayed on a full screen in the display apparatus and in a second case where the image is displayed on any of divided screens in the display apparatus and the difference amount is greater than a threshold, and the clock controller allows the clock frequency to decrease when neither the first case nor the second case is applicable.

(Supplementary Note 5)

An image transmission system comprising:

an image transmission apparatus; and a display apparatus connected to the image transmission apparatus via a network, wherein the image transmission apparatus comprises:

a processor that performs a process of generating image data and that transmits the image data to the display apparatus; and a clock controller that receives information relating to a display mode of the display apparatus from the display apparatus and that controls a drive clock frequency of the processor based on the information.

(Supplementary Note 6)

The image transmission system according to Supplementary Note 5, wherein the display apparatus comprises:

a receiving side display unit that displays an image based on the image data; and a display setting unit that sets the display mode in the receiving side display unit and notifies the image transmission apparatus of the information based on the set display mode.

(Supplementary Note 7)

The image transmission system according to Supplementary Note 5 or 6, wherein at least one of the display apparatuses and at least one of the image transmission apparatuses are connected to the network.

(Supplementary Note 8)

The image transmission system according to any one of Supplementary Notes 5 to 7, wherein a plurality of the image transmission apparatuses are connected to the network and the display apparatus can select whether to display image data from the plurality of image transmission apparatuses on a plurality of divided screens respectively or to display only image data from one of the plurality of image transmission apparatuses.

(Supplementary Note 9)

The image transmission system according to any one of Supplementary Notes 5 to 8, wherein the image transmission apparatus further comprises a display unit that displays an image, and the processor captures an image displayed on the display unit and generates the image data that is based on a difference image between the image captured last time and the image captured this time.

(Supplementary Note 10)

The image transmission system according to Supplementary Note 9, wherein the clock controller controls the drive clock frequency based on the information and a difference amount generated when acquiring the difference image.

(Supplementary Note 11)

A control method of an image transmission apparatus provided with a processor that performs a process of generating image data and that transmits the image data to a display apparatus connected via a network, the control method comprising:

receiving information relating to a display mode of the display apparatus from the display apparatus; and controlling a drive clock frequency of the processor based on the information.

(Supplementary Note 12)

The image transmission method according to Supplementary Note 11, wherein the drive clock frequency is controlled based on the information and a difference amount generated when the processor captures an image and acquires difference image between an image captured last time and an image captured this time.

(Supplementary Note 13)

The image transmission method according to Supplementary Note 12, wherein the drive clock frequency is controlled so as to prevent the drive clock frequency from decreasing in a first case where the image is displayed on a full screen in the display apparatus and in a second case where the image is displayed on any of divided screens in the display apparatus and the difference amount is greater than a threshold, and the clock frequency is allowed to decrease when neither the first case nor the second case is applicable.

(Supplementary Note 14)

A program that causes a computer provided with a processor that performs a process of generating image data and that transmits the image data to a display apparatus connected via a network to execute:

a process of receiving information relating to a display mode of the display apparatus from the display apparatus; and a process of controlling a drive clock frequency of the processor based on the information.

(Supplementary Note 15)

The program according to Supplementary Note 14, wherein the process of controlling the drive clock frequency is a process of controlling the drive clock frequency based on the information and a difference amount generated when the processor captures an image and acquires a difference image between an image captured last time by the processor and an image captured this time.

(Supplementary Note 16)

The program according to Supplementary Note 15, wherein the process of controlling the drive clock frequency controls the drive clock frequency so as to prevent the drive clock frequency from decreasing in a first case where the image is displayed on a full screen in the display apparatus and in a second case where the image is displayed on any of divided screens in the display apparatus and the difference amount is greater than a threshold, and allows the clock frequency to decrease when neither the first case nor the second case is applicable.

REFERENCE SIGNS LIST

10 Network
20, 20A to 20C Image transmission apparatus
21 Main unit
22 Display unit
30 Processing unit
31 CPU
32 Clock controller
33 RAM
34 Storage apparatus
35, 42 Communication unit
40, 40A, 40B Display apparatus
41 Receiving side display unit
43 Display setting unit

The invention claimed is:

1. An image transmission apparatus comprising:

a processor that performs a process of generating image data and that transmits the image data to a display apparatus connected via a network;

a clock controller that receives information relating to a display mode from the display apparatus and that controls a drive clock frequency of the processor based on the information, said display mode showing a display area range of a content on a screen of the display apparatus; and a display unit that displays an image, wherein the processor captures the image displayed on the display unit and generates the image data that is based on a difference image between the image captured last time and the image captured this time, the clock controller controls the drive clock frequency based on the information and a difference amount generated when acquiring the difference image, the clock controller controls the drive clock frequency so as to prevent the drive clock frequency from decreasing in a first case where the image is displayed on a full screen in the display apparatus and in a second case where the image is displayed on any of divided screens in the display apparatus and the difference amount is greater than a threshold, and the clock controller allows the drive clock frequency to decrease when neither the first case nor the second case is applicable.

2. The image transmission apparatus according to claim 1, wherein the display mode includes: a full screen display mode for displaying one image using whole of a displayable range of the screen of the display apparatus; a reduction display mode for displaying only one image using only part in the displayable range; and a divided display mode in which the displayable range is divided into two or more segments and images differing from one segment to another are displayed.

3. The image transmission apparatus according to claim 1, wherein the display mode includes a plurality of display modes showing different varying display area ranges of content on the screen of the display apparatus.

4. An image transmission system comprising:

an image transmission apparatus; and a display apparatus connected to the image transmission apparatus via a network, wherein the image transmission apparatus comprises:

a processor that performs a process of generating image data and that transmits the image data to the display apparatus; and a clock controller that receives information relating to a display mode from the display apparatus and that controls a drive clock frequency of the processor based on the information, said display mode showing a display area range of a content on a screen of the display apparatus; and a display unit that displays an image, wherein the processor captures the image displayed on the display unit and generates the image data that is based on a difference image between the image captured last time and the image captured this time, the clock controller controls the drive clock frequency based on the information and a difference amount generated when acquiring the difference image, the clock controller controls the drive clock frequency so as to prevent the drive clock frequency from decreasing in a first case where the image is displayed on a full screen in the display apparatus and in a second case where the image is displayed on any of divided screens in the display apparatus and the difference amount is greater than a threshold, and the clock controller allows the drive clock frequency to decrease when neither the first case nor the second case is applicable.

5. The image transmission system according to claim 4, wherein a plurality of the image transmission apparatuses are connected to the network and the display apparatus can select whether to display image data from the plurality of image transmission apparatuses on a plurality of divided screens respectively or to display, only image data from one of the plurality of image transmission apparatuses.

6. The image transmission system according to claim 4, wherein the display apparatus comprises:
a receiving side display unit that displays an image based on the image data; and
a display setting unit that sets the display mode in the receiving side display unit and notifies the image transmission apparatus of the information based on the set display mode.

7. The image transmission system according to claim 6, wherein a plurality of the image transmission apparatuses are connected to the network and the display apparatus can select whether to display image data from the plurality of image transmission apparatuses on a plurality of divided screens respectively or to display, only image data from one of the plurality of image transmission apparatuses.

8. The image transmission system according to claim 4, wherein the display mode includes a plurality of display modes showing different varying display area ranges of content on the screen of the display apparatus.

9. The image transmission system according to claim 4, wherein the display mode includes: a full screen display mode for displaying one image using whole of a displayable range of the screen of the display apparatus; a reduction display mode for displaying only one image using only part in the displayable range; and a divided display mode in which the displayable range is divided into two or more segments and images differing from one segment to another are displayed.

* * * * *